United States Patent [19]

Iwasaki et al.

[11] Patent Number: 4,589,208
[45] Date of Patent: May 20, 1986

[54] PORTABLE ELECTRIC CIRCULAR SAW

[75] Inventors: Juzaemon Iwasaki, Nagahama; Shinji Ihara, Hikone, both of Japan

[73] Assignee: Matsushita Electric Works, Ltd., Osaka, Japan

[21] Appl. No.: 620,938

[22] Filed: Jun. 15, 1984

[30] Foreign Application Priority Data

Aug. 13, 1983 [JP] Japan .................. 58-148533

[51] Int. Cl.⁴ .............................. B27B 9/02
[52] U.S. Cl. ......................... 30/376; 30/391
[58] Field of Search ............. 30/376, 377, 295, 375, 30/391

[56] References Cited

U.S. PATENT DOCUMENTS

| | | | |
|---|---|---|---|
| 1,830,579 | 11/1931 | Wappat | 30/391 |
| 1,854,510 | 4/1932 | Haas | 30/376 |
| 2,346,961 | 4/1944 | Gundelfinger | 30/391 |
| 2,761,474 | 9/1956 | Dolan | 30/376 |
| 2,790,468 | 4/1957 | Wilhide | 30/391 |
| 2,828,784 | 4/1958 | Damijonaitis | 30/376 |
| 3,292,673 | 12/1966 | Gregory | 30/377 |
| 3,662,796 | 5/1972 | Batistelli | 30/376 X |
| 4,319,433 | 3/1982 | Nolen | 30/295 |

Primary Examiner—Jimmy C. Peters
Attorney, Agent, or Firm—Stevens, Davis, Miller & Mosher

[57] ABSTRACT

A portable electric circular saw with a tiltable base plate is disclosed herein. The circular saw comprises a housing for accommodating an electric motor, a circular saw blade operatively connected to the motor to be driven thereby, a safety guard connected to the housing for enclosing the portion of the saw blade, the base plate upon which the above parts are mounted and which is adapted to engage upon the surface of a workpiece to be sawed, and a bracket for attaching the base plate to the housing. One end portion of the bracket is secured to the housing and the opposite end thereof is pivotally connected to the base plate such that the base plate can pivot about an axis within the plane of the saw blade for adjustment of the angle of the cut. The base plate joins the bracket by fastening means at the portion intermediate the ends of the bracket after the base plate is set at a desired angle with respect to the saw blade. Thus the base plate is linked through the bracket to the housing itself and is not required to be connected to the safety guard, which eliminates the necessity of giving a greater strength to the safety guard enough to be securely connected at its front end to the base plate. Accordingly, the safety guard can be made of lightweight material free from the strength requirement such that the overall weight of the circular saw can be reduced so as to be easily manipulated.

12 Claims, 11 Drawing Figures

PORTABLE ELECTRIC CIRCULAR SAW

BACKGROUND OF THE DISCLOSURE

1. Fields of the Invention

This invention relates generally to a portable electric circular saw, and more particularly to an electric circular saw of the type capable of adjusting the angle of the cut.

2. Description of the prior art

A typical prior portable electric circular saw of the above type is shown in FIGS. 1 through 3 and comprises a housing 1 for accommodating an electric motor therein, a handle 2 projected upwardly from the housing 1, a circular saw blade 3 operatively connected through gearing to a motor shaft, a safety guard 4 fixed to the housing 1 so as to enclose the upper portion of the saw blade 3, and a base plate 5 upon which the above parts are supported and which is adapted to engage the upper surface of a workpiece to be sawed. An adjusting bracket 6 is attached to the front end of the safety guard 4 for connecting the base plate 5 to the housing 1 and at the same time for tiltably supporting the housing 1 upon the base plate 5 so that the saw blade 3 can be set at an angle in order to make a beveled or angle cut across the workpiece to be sawed. To this end, the base plate 5 is pivotally secured by means of a pivot pin 7 to the lower portion of the adjusting bracket 6 so as to be movable about an axis within the plane of the saw blade 3 for effecting the angle cut. The adjusting bracket 6 is provided with a laterally extending lug portion 6a carrying a screw 8 rotatively fixed thereto. Cooperative with and positioned in face to face contact with the lug portion 6a is a generally triangular plate section 5a of the base plate 5 having therein a graduated arcuate slot 9 through which said screw 8 extends. Within the arcuate path of the slot 9 the screw 8 is allowed to move so that the base plate 5 pivots about the pivot pin 7 for adjusting the angle of the saw blade 3 relative to the base plate 5. After the saw blade 3 is set at a desired angle, a wing nut 10 is tightened on the screw 8 to securely fasten the base plate 5 to the housing 1.

However, in this prior art device in which the base plate 5 is directly connected to the safety guard 4, the safety guard 4 should be of substantial mechanical strength for securely supporting the base plate 5 and be therefore made of steel or the like rigid material which adds an extra weight to the device, militating against the demand for reducing the weight of the device to be completely portable and easy to handle. This is particularly disadvantageous where the device is powered by an incorporated electric battery of heavy construction in its nature. In fact, the safety guard 4 should have a still increased strength and weight if the housing 1 includes the battery together with the motor both of heavy construction. Accordingly, the above connecting structure of the base plate 5 and the safety guard 4 has long been a trouble in making the device light in weight enough to be portable. In addition, the above structure in which the base plate 5 is securely fastened to the adjusting bracket 6 at the portion which is laterally spaced considerably from the connecting portion of the adjusting bracket 6 with the safety guard 4 brings about a problem that the torsion force acting about the connecting portion of the adjusting bracket 6 with the safety guard 4 will increase as the connection between the base plate 5 and the lug portion 6a goes far from the pivot pin 7 for attaining easy adjustment of the angle of the cut.

SUMMARY OF THE INVENTION

The above shortcoming has been eliminated by the present invention which comprises a motor, a saw blade connected to the motor to be driven thereby, a housing accommodating the motor, a safety guard attached to the housing for enclosing the portion of the blade, and a base plate upon which the above parts are mounted so as to be supported thereby on a workpiece to be sawed. Said base plate is connected to the housing rather than to the safety guard by means of an adjusting bracket in such a way that the base plate can pivot about an axis within the plane of the saw blade for tilting the saw blade at an angle with respect to the base plate. With this arrangement of the base plate being connected to the housing itself, the safety guard is no more responsible for attaching the base plate so that it can be free from the mechanical strength and therefore can be made of light material, which helps the device be constructed light in weight enough to be completely portable.

Accordingly, it is a primary object of the present invention to provide a portable electric circular saw in which the base plate is securely connected to the housing accommodating the motor so as to make the safety guard free from being connected to the base plate and to make the safety guard lightweight, enabling the overall circular saw to be made in lightweight construction for easy manipulation thereof.

Said adjusting bracket is provided with a lug portion extending laterally from the connecting portion thereof with the housing toward the front end of the safety guard to have its free end pivotally connected to the base plate. Cooperating with and positioned in face to face contact with the lug portion is a sector-shaped portion of the base plate which slides on the lug portion in adjusting the tilting angle of the base plate with respect to the saw blade and is fixedly fastened thereto by fastening means after determining that angle. Thus, the base plate joins the adjusting bracket at that point to be substantially integral therewith, so that two connecting portions of the adjusting bracket with the housing and of the base plate with the adjusting bracket are responsible for bearing the weight or load acting between the base plate and the housing. With the above arrangement, the connecting portion of the adjusting bracket with the base plate can be positioned as close as possible to the connecting portion of the adjusting bracket with the housing as elongating the length between the pivot axis and the fastening means for the purpose of easy adjustment of the angle of the cut, such that the connecting portion of the adjusting bracket with the housing can see minimum torsion force when the base plate bears the weight of the housing and the other parts and the operational force acting thereon upon advancing the device on a workpiece to be sawed. Therefore, the base plate can be securely attached to the housing in such a manner as to minimize a torsion force about the connecting portion of the adjusting bracket with the housing, which is another object of the present invention.

Other objects and advantages of the present invention will be readily understood from the detailed description thereof taken with the accompanying drawings.

DETAILED DESCRIPTION OF THE PREFERRED EMBODIMENT

Figure 1:
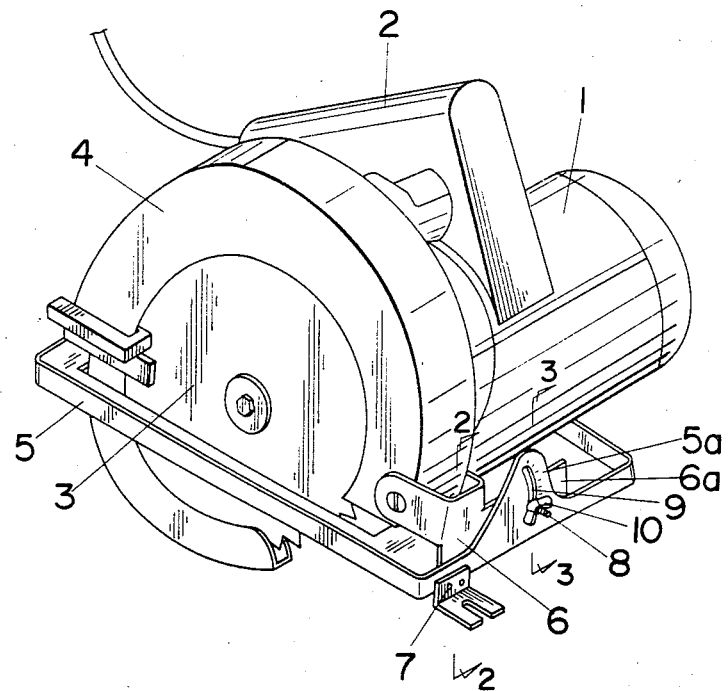
FIG. 1 is a perspective view of a prior art electric circular saw.
Figure 2:
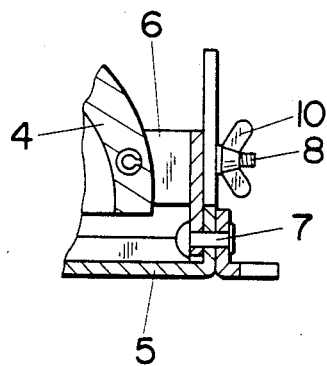
FIG. 2 is a sectional view taken on line 2—2 of FIG. 1.
Figure 3:
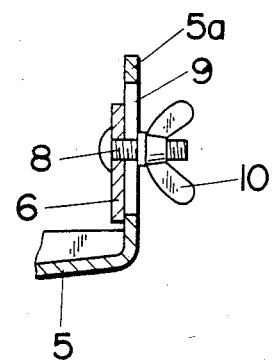
FIG. 3 is a sectional view taken on line 3—3 of FIG. 1.
Figure 4:
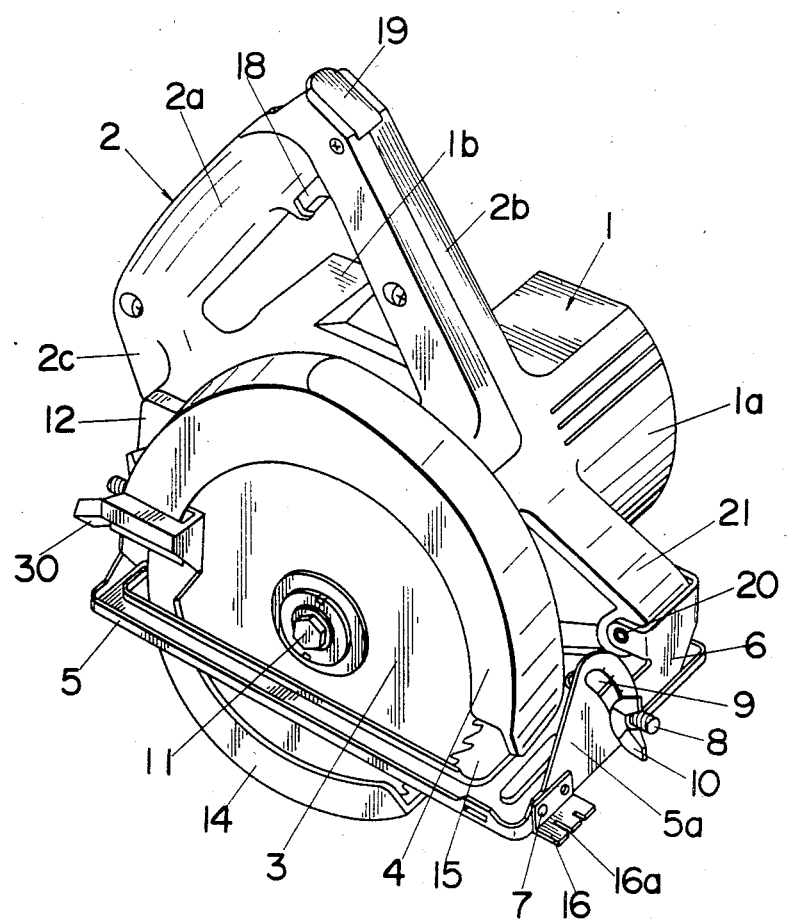
FIG. 4 is a perspective view of a portable electric circular saw in accordance with one embodiment of the present invention.
Figure 5:
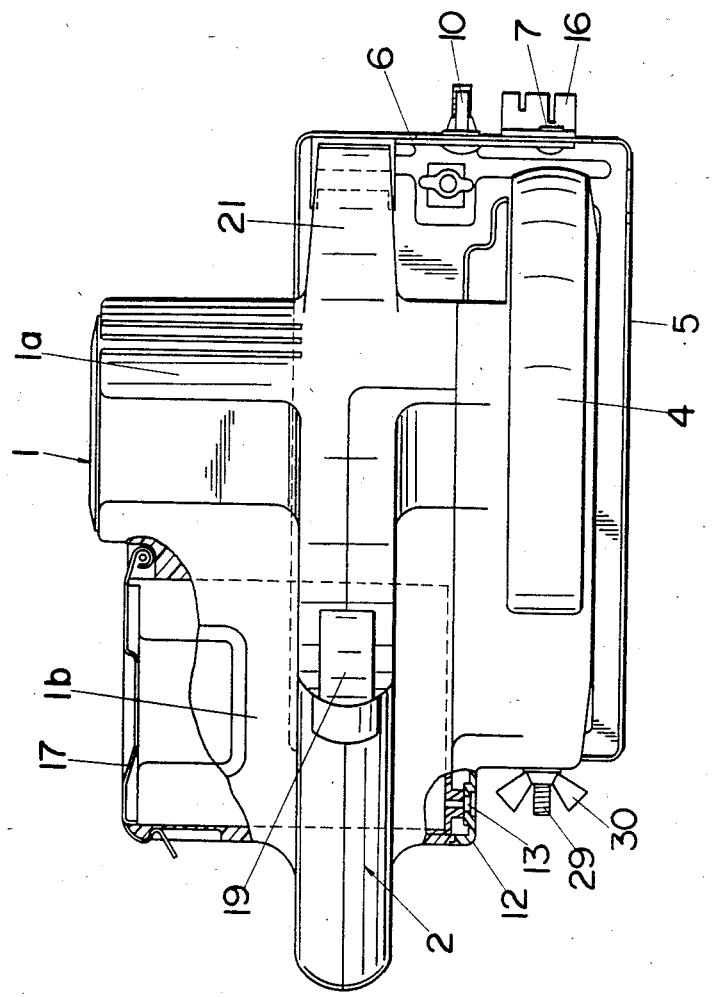
FIG. 5 is a top plan view of the above circular saw.
Figure 6:
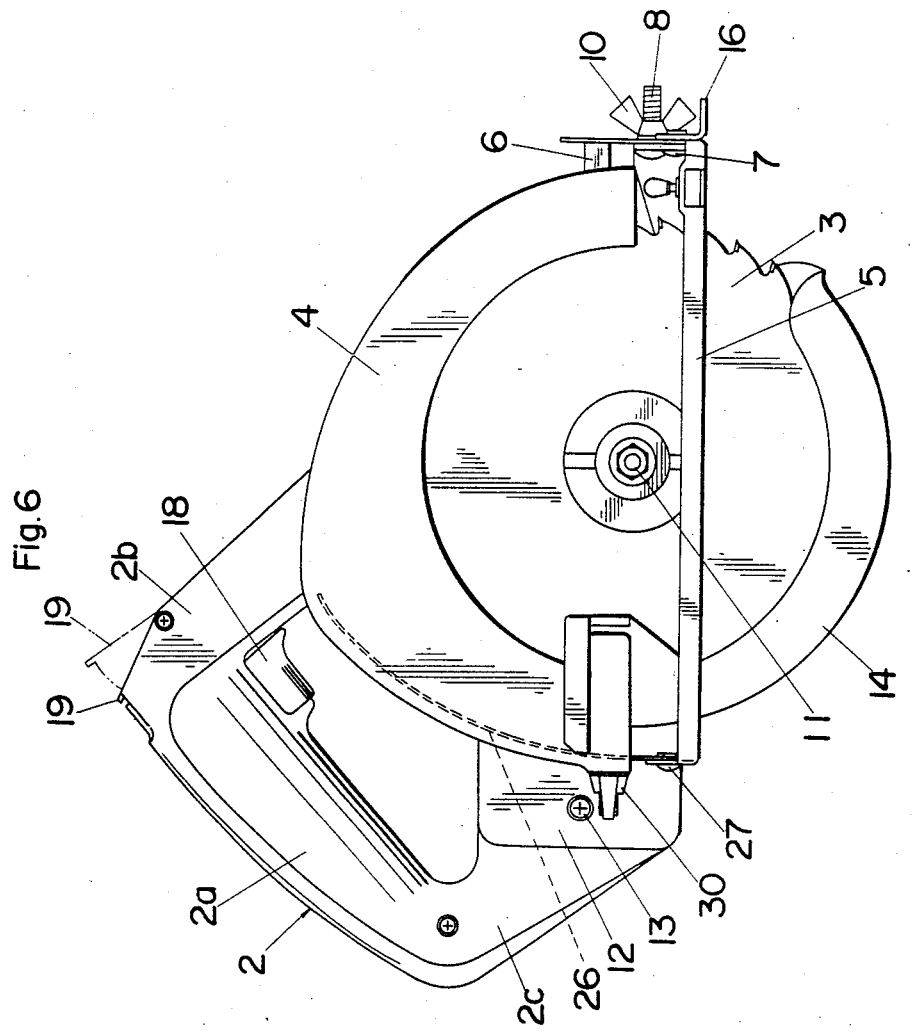
FIG. 6 is an elevation of the above circular saw.

The present invention shall now be explained with reference to FIGS. 4 through 10 which illustrate a portable electric circular saw powered by an incorporated rechargeable battery in accordance with a preferred embodiment of the present invention. A housing 1 comprises a motor chamber 1a for accommodating a motor therein, and a battery chamber 1b in which the rechargeable battery is removably received. A handle 2 projecting upwardly of the housing 1 is formed integrally therewith. Said housing 1 is molded from a plastic material of higher mechanical strength but of relatively lightweight such as polycarbonate and polyacetal. The output rotor shaft of the motor is connected to a drive spindle 11 carrying the circular saw blade 3 thereon with both axes arranged transversely of the housing 1 in parallel relationship with each other by means of speed reduction means such as reduction gears so as to rotate the saw blade 3 about the drive spindle 11. Attached to the housing 1 are a fixed safety guard 4 of a semi-circular form secured to a sideward end of the housing 1 so as to cover the upper portion of the saw blade 3, the guard 4 being made of lightweight material such as polyvinyl chloride and polypropylene and being formed with side flange 12 which is fastened by screws (only one screw 13 is shown in the figures) to a corresponding seating portion of the housing 1. A base plate 5 is attached to the housing 1 for supporting the circular saw upon the workpiece to be sawed. A movable safety guard 14 is pivotally connected to the housing 1 about the axis of the drive spindle 11 and is urged by a spring in the direction of covering the lower periphery of the saw blade 3. The base plate 5 is made of a metal plate to be of a generally rectangular configuration and is provided with an upwardly extending vertical flange along its edge. At the front of the base plate 5, a triangular plate section 5a extends integrally upwardly from the flange to have therein an arcuate slot 9. The base plate 5 is provided in its bottom with an enlarged opening 15 of rectangular shape extending longitudinally of the electric saw. The saw blade 3 enclosed by the movable safety guard 14 is exposed downwardly of the base plate 5 through said opening 15. A mark follower 16 is attached to the front flange of the base plate 5 to be disposed forwardly of the saw blade 3 and is of L-shaped configuration composed of horizontal and vertical flat sections, vertical section being secured to the front flange of the base plate 5 so that the horizontal section is within the bottom plane of the base plate 5 and so that a slit 16a in the horizontal section is in alignment with the plane of the saw blade 3.

The rechargeable battery comprising a lead storage battery is in the form of a battery pack to be inserted in and out from the battery chamber 1b with a lid 17 on the side opposite to the saw blade 3. Said rechargeable battery is provided with terminals which are to be electrically connected when received in the battery chamber 1b to the motor through a trigger switch 18 mounted on the upper portion of the handle 2. Said handle 2 is of generally downwardly disposed U-shaped configuration having an elongated top grip 2a and legs 2b, 2c extending downwardly from the opposite ends thereof. This handle 2 is formed integrally with the housing 1 and extends upwardly therefrom with the forward leg 2b joined the housing 1 at the upward portion of the motor chamber 1a and the rearward leg 2c joined at the rearward portion of the battery chamber 1b to bridge between these two longitudinally disposed chambers 1a, 1b in such a way as to support the saw nearly in balance as well as to lay the top grip 2a along the longitudinal direction or the cutting direction of the saw blade 3. The handle 2 is provided at the upper end of the top grip 2a with a locking means 19 for prohibiting the trigger switch 18 from being pulled on unless it is raised as indicated by the broken line in FIG. 6.

Said adjusting bracket 6 attaching the base plate 5 to the housing 1 serves to adjust the angle of the cut as well as the depth of the cut in combination with means for fastening the rear end of the base plate 5 to the rear end of the safety guard 4. One end of the adjusting bracket 6 is pivotally connected to the base plate 5 by means of a pivot pin 7 defining a pivot axis which lies within the plane of the saw blade 3 and about which the base plate 5 pivots for tilting the base plate 5 with respect to the saw blade 3, or adjusting the angle of the cut. The other end of the adjusting bracket 6 is pivotally connected to the housing 1 by means of a pivot pin 20 defining another pivot axis which is perpendicular to the above axis and therefore parallel to the saw axis, so that the base plate 5 can pivot about this axis for varying the amount of projection of the saw blade 3 below the base plate 5 or adjusting the depth of the cut. The middle portion of the adjusting bracket 6 is fastened to said triangular plate section 5a of the base plate 5 by fastening means comprising a screw 8 rotatively fixed to the adjusting bracket 6 to extend through the arcuate slot 9 formed in said triangular plate section 5a and a wing nut 10. Thus, the base plate 5 is secured by the fastening means to the adjusting bracket 6 which in turn is connected to the housing 1, establishing the connection of the base plate 5 to the housing 1 itself. With the result of this, the strong connection between the base plate 5 and the housing 1 can be effected in contrast to the case where the base plate 5 is connected through the adjusting bracket 6 and the safety guard 4 to the housing 1 as seen in the prior circular saw with a tiltable base plate 5.

Figure 7:
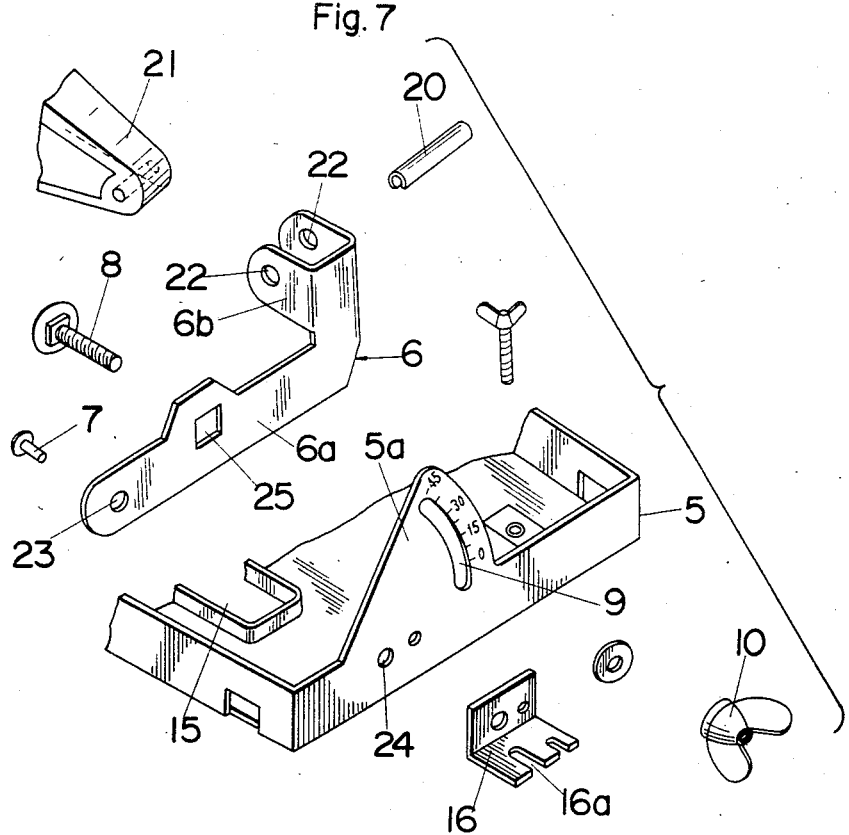
FIG. 7 is an exploded perspective view of the several members employed in the above circular saw.
Figure 10A:
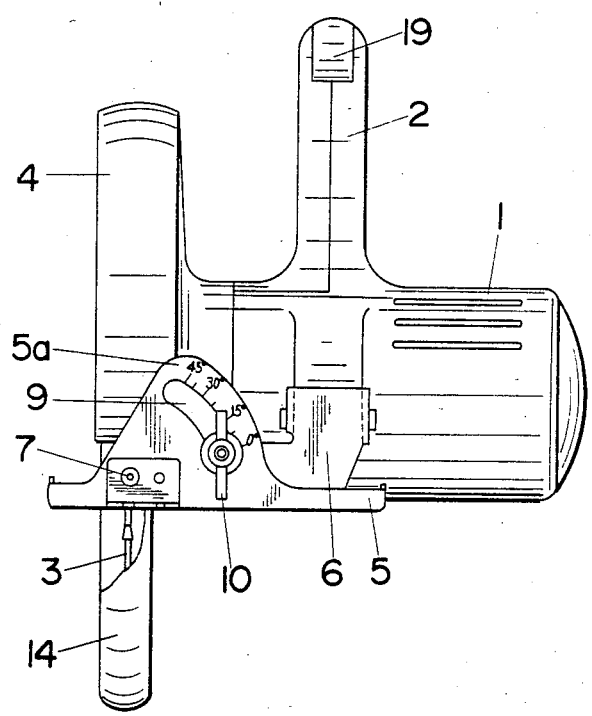
FIGS. 10A and 10B are end views respectively illustrating the saw blade in a vertical position and in a maximum tilted position.
Figure 10B:
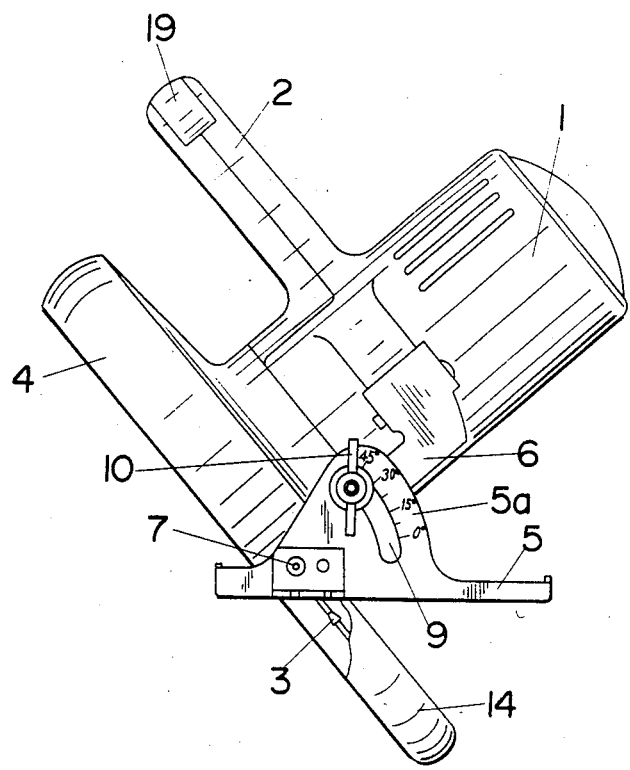

FIG. 7 shows the details of several members including said adjusting bracket 6 for pivotally supporting the housing 1 on the base plate 5. As shown in the figure, the adjusting bracket 6 comprises a U-shaped holding portion 6b with a pair of opposed tabs and a laterally extending lug portion 6a. The holding portion 6b embraces a prong 21 projecting integrally from the front end of the housing 1 within the same plane of said handle 2 and is pivotally connected thereto by means of the pivot pin 20 which extends through the prong 21 to be journaled thereby and is fixed at both ends to the holes 22 formed in the respective tabs of the holding portion 6b, so that the adjusting bracket 6 and the base plate 5 connected thereto can pivot about the pivot pin 20 for adjustment of the depth of the cut as previously discussed. Said lug portion 6a is formed with a hole 23 which is in alignment with the plane of the saw blade 3 for receiving said pivot pin 7 extending through a hole 24 in the base plate 5, so that the base plate 5 is pivotally connected to the adjusting bracket 6 and is allowed to rotate about the pivot pin 7 for adjustment of the angle of the cut. The pivot pin 7 also serves to fix said mark follower 16 to the front edge of the base plate 5. Formed intermediately in the lug portion 6a is a square hole 25 for receiving the correspondingly shaped square root adjacent to the head of said screw 8 to hold the same unrotatively. The screw 8 thus held on the adjusting bracket 6 extends through the arcuate slot 9 in said triangular plate portion 5a which is in face to face contact with the lug portion 6a for allowing the sliding movement of the triangular plate portion 5a relative to the adjusting bracket 6 in setting an angle of the base plate 5 with respect to the saw blade 3. Provided on the triangular plate portion 5a is an angular graduation for easy setting of the angle of the cut. After setting the angle of the cut, the wing nut 10 is tightened on the screw 8 to securely fix the base plate 5 to the adjusting bracket 6. Said arcuate slot 9 is such that the base plate 5 can be moved from the horizontal position as shown in FIG. 10A to a variety of tilted position up to an angle of 45° as shown in FIG. 10B. In the present embodiment, the holes 23, 25 and the apex of the prong 21 are arranged generally in a line so that the connecting portion between the adjusting bracket 6 and the base plate 5 and the connecting portion between the adjusting bracket 6 and the housing 1 are arranged in that line.

Figure 8:
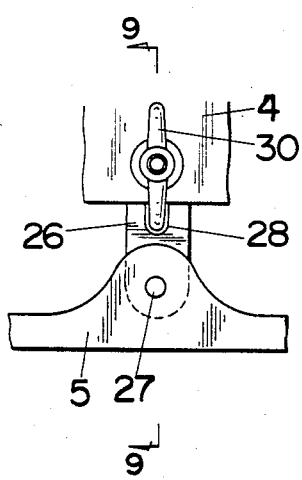
FIG. 8 is a partial end view of the above circular saw.
Figure 9:
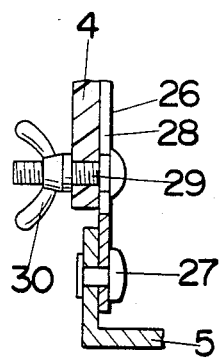
FIG. 9 is a sectional view taken on line 9—9 of FIG. 8.

FIGS. 8 and 9 show parts connecting the rear end portion of the base plate 5 to the rear end portion of the safety guard 4 which has a larger thickness than those of the other portions to have a sufficient strength for connecting the base plate 5 and which is designed in a reinforcing configuration. An adjusting blade 26 in the form of an elongated arc is retractably received within the safety guard 4 in abutting engagement with the inner periphery of the safety guard 4 so as to be slidable therealong and is pivotally connected by means of a pivot pin 27 at its lower end to a raised section 5b of the rear flange of the base plate 5, said pivoted point being in alignment with said pivot axis of the pivot pin 7 for allowing said movement of the base plate 5 about the pivot axis. The adjusting blade 26 is formed with an elongated slit 28 extending substantially along the entire length thereof for slidably receiving the square root of a cut depth adjusting screw 29 which extends through the rear end portion of the safety guard 4. A wing nut 30 on the screw 29 is for securely fastening the adjusting blade 26 to the safety guard 4 at any desired portion along the length of the adjusting blade 26. When the wing nut 30 is loosened the adjusting blade 26 can be drawn from the safety guard 4 so that the housing 1 together with the saw blade 3 is lifted upwardly from the base plate 5 for reducing the amount of projection of the saw blade 3 below the base plate 5. In this way, the depth of the cut can be readily adjusted.

As mentioned above, since the base plate 5 is not connected to the front end of the safety guard 4 and is only connected to the reinforced rear end of the safety guard 4, the safety guard 4 is not required to be made of rigid and therefore heavy material enough to be firmly connected at its front end to the base plate 5, and therefore the safety guard 4 can be made of lightweight material free from the requirement of supporting at its front the base plate 5. With the result of this, the overall weight of the electric circular saw can be reduced for easy handling and particularly the weight on the side of the saw blade 3 can be reduced for achieving good balancing upon the handle 2, which is most advantageous for placing correctly the saw on the workpiece. Besides the above, the safety guard 4 can provide aesthetic appeal by being made from a wide variety of plastic material.

Although the present invention has been described in its preferred embodiment, it should be understood by those skilled in the art that the present invention is not limited to the present embodiment and that various changes and modifications may be made without departing from the scope of the present invention.

What is claimed is:

1. A portable electric circular saw which comprises:
an electric motor;
a housing for accommodating the motor;
a circular saw blade operatively connected to the motor to be driven thereby to rotate and disposed on one side of the housing;
a fixed safety guard secured to the housing to enclose the upper portion of the saw blade;
a base plate upon which said housing is supported and which is adapted to engage the upper surface of a workpiece to be sawed;
a bracket including a portion connected at its one end to the housing and pivotally connected at its opposite end to the base plate in such a manner that the housing is tiltable relative to the base plate about an axis within the plane of the saw blade for adjustment of the angle of the cut; and
fastening means for fastening the bracket to the base plate to prohibit the pivotal movement thereof;
wherein the connecting portion of said one end of the bracket with the housing, the fastening portion of the intermediate position of the bracket to the base plate, and the pivotally connecting portion of said opposite end of the bracket with the base plate are arranged generally in a line.

2. The portable electric circular saw as set forth in claim 1 wherein said fixed safety guard is made of plastics.

3. The portable electric circular saw as set forth in claim 1 wherein said bracket is pivotally connected at said one end to the housing in such a manner that the housing can pivot about a second axis parallel to the axis of the saw for adjustment of the depth of the cut.

4. A portable electric circular saw comprising:
an electric motor;
a housing means for accommodating the motor;
a circular saw blade operatively connected to the motor to be driven thereby to rotate and disposed on one side of said housing;
a fixed safety guard secured to the housing to enclose an upper portion of said saw blade;
a base plate upon which said housing is supported and which is adapted to engage an upper surface of a workpiece to be sawed;

means for pivotally connecting said housing to said base plate independent of said safety guard and along a pivot axis in a plane including said saw blade; and fastening means for fastening said connecting means to the base plate to prohibit said pivotal movement thereof; wherein said connecting means comprises:

a bracket extending in a direction generally perpendicular to said plane including said saw blade;

means for pivotally mounting said bracket at one end thereof to said housing for pivotal movement about an axis perpendicular to said plane; and means for pivotally connecting said bracket at an other end thereof to said base plate for pivotal movement about an axis parallel to said plane.

5. The portable electric circular saw as set forth in claim 4, wherein said bracket includes a U-shaped portion disposed at said one end and an aperture at said other end.

6. The portable electric circular saw as set forth in claim 5, wherein a portion of said housing is received into said U-shaped portion of said bracket and said mounting means comprises a pin extending through said U-shaped portion and said housing portion.

7. The portable electric circular saw as set forth in claim 4, wherein said connecting means comprises a pivot pin extending through said bracket aperture.

8. The portable electric circular saw as set forth in claim 4, wherein said bracket includes a U-shaped portion disposed at said one end and an aperture at said other end, and a portion of said housing is received into said U-shaped portion of said bracket and said mounting means comprises a pin extending through said U-shaped portion and said housing portion, wherein said connecting means comprises a pivot pin extending through said bracket aperture.

9. The portable electric circular saw as set forth in claim 4, wherein said base plate includes a triangular portion and said bracket includes an aperture intermediate said one end and said other end, and said fastening means comprises means extending through said intermediate aperture for adjustably securing said base plate triangular portion and said bracket against relative movement therebetween.

10. The portable electric circular saw as set forth in claim 8, wherein said base plate includes a triangular portion and said bracket includes an aperture intermediate said one end and said other end, and said fastening means comprises means extending through said intermediate aperture for adjustably securing said base plate triangular portion and said bracket against relative movement therebetween.

11. The portable electric circular saw as set forth in claim 9, wherein said base plate triangular portion includes an arcuate slot with a center of curvature coincident with said connecting means.

12. The portable electric circular saw as set forth in claim 10, wherein said base plate triangular portion includes an arcuate slot with a center of curvature coincident with said connecting means.

* * * * *